Patented Apr. 7, 1942

2,278,973

UNITED STATES PATENT OFFICE 2,278,973

VAT DYE PREPARATIONS

Clifford Edward Carr, Pennsgrove, N. J., assignor to E. I. du Pont de Nemours & Company, Wilmington, Del., a corporation of Delaware No Drawing. Application June 10, 1939,
Serial No. 278,407

9 Claims. (Cl. 260—316)

This invention relates to an improved process for the preparation of anthraquinone vat color pastes and powders, in which the color particles are in a uniformly fine microcrystalline form, making these dye preparations particularly suitable for use in padding and printing of textile fibers, and for the preparation of pigments.

It is well known that anthraquinone vat colors are usually soluble in concentrated sulfuric acid (96–100%) from which they may be precipitated by diluting with water. The size of the color particles may be altered materially by the manner in which the color is precipitated from the sulfuric acid solution. Usually, upon the slow addition of water the colors are precipitated in large uniform crystals, while by drowning the sulfuric acid solution in water, the dye is precipitated in an amorphous state. The size of the crystalline particles may also be varied by changing the temperature of the water into which the sulfuric acid solution of the color is added, and by controlling the final concentration of the acid in which the crystal form of the dye is established.

In the dyeing of fibers by the pigment pad reduction method, and in the preparation of printing pastes or powders the color particles must be in a very uniformly fine micro-crystalline state, if uniform dyeings and prints are to be obtained. While many of the dyes in the anthraquinone series are suitable for general use in dyeing and printing when processed by the known methods, there are certain dyes which are difficult to prepare in a crystalline form suitable for general application, by the known methods, particularly where color pastes of high solids content are desired. In the preparation of dye powders the amorphous or the coarsely crystalline pastes give aggregates, when evaporated to dryness, which cannot be redispersed properly in the padding liquor or printing pastes resulting in blotchy and specky dyeings when used in pigment pad dyeing or in printing.

It is therefore an object of this invention to provide a process for preparing dye pastes and powders of anthraquinone vat dyestuffs of the class consisting of those quinoid dyestuffs containing the pyrene or perylene nucleus and those of the anthrimide-carbazole series in a uniformly fine, micro-crystalline form suitable for general application purposes, even when employed in pastes of high color solids content.

I have found that certain dyes of the anthraquinone vat dyestuff class, namely those which are generally referred to as quinoid dyestuffs containing the pyrene or perylene nucleus such as the dyes of the dibenzanthrone, isodibenzanthrone, pyranthrone and dibenzpyrenequinone series, and those of the anthrimide-carbazole series, which are completely precipitated from concentrated sulfuric acid within a narrow acid concentration range, are precipitated from sulfuric acid solutions in a very uniform micro-crystalline state by the addition of hydrated inorganic salts to the sulfuric acid solution of the dyestuff. After the crystalline form of the color particles is established, by substantially completely precipitating the color from the acid in this manner the mass is drowned in water, or on ice and the dye crystals are filtered off. Alternatively the inorganic salt in dehydrated form may be added to the sulfuric acid solution followed by the addition of an amount of water of approximately the quantity the particular salt can hold as water of crystallization.

Sufficient hydrated salt (or its equivalent of anhydrous salt and water) should be added to precipitate substantially all of the dye from the sulfuric acid solution so that the crystal form is fixed prior to drowning the mass in water. The inorganic salt should be of a metal whose sulfate is water soluble, or soluble in the dilute acid from which the dye is finally separated.

The following examples are given to illustrate the invention. The parts used are by weight.

Example 1

One part of pyranthrone is dissolved in 10 parts of 98% sulfuric acid at a temperature of 20 to 50° C. When solution is complete (as determined by viewing a sample under the microscope) it is cooled to 15° to 25° C. and, with very efficient agitation and cooling, 3.4 parts of hydrated sodium sulfate (Glauber's salt or $Na_2SO_4 + 10\ H_2O$) are added as rapidly as possible. The cooling must be sufficient to prevent a temperature rise above 70° to 90° C. or a temperature which might injure the dyestuff being treated. The addition of hydrated sodium sulfate is made at such a rate as not to cause excessive local thickening of the sulfuric acid mass. The thick magma is agitated for several hours and drowned in 50 to 70 parts of cold water under efficient agitation. The dilute sulfuric acid slurry is filtered and washed acid-free. In the filter cake which contains 20 to 30% solids, the pyranthrone is present as micro-crystals which shimmer when made into a paste with the usual dispersing agents.

*Example 2*

1 part of the condensation product of Bz-2:Bz-2'-dihydroxydibenzanthrone and ethylene dibromide (the product of Example 4 of U. S. P. 1,950,366), is dissolved in 10 parts of 96% sulfuric acid at 30–40° C. When solution is complete, it is cooled to 0° to 10° C. and, maintained at this temperature, with efficient agitation while 2.33 parts of hydrated sodium sulfate ($Na_2SO_4 + 10\ H_2O$) are slowly added over a period of 3 to 6 hours. The mass is agitated for several hours longer at 10 to 20° C. It is then drowned in 60 to 80 parts of cold water, filtered off and washed acid-free. The uniform micro-crystalline product obtained may be converted to very fluid concentrated assistant pastes with such printing assistants as triethanolamine, glycerine or diethylene glycol.

*Example 3*

1 part of purified 4:5-di(benzoyl amino)-1:1'-dianthrimide-carbazole is dissolved in 10 parts of 96% sulfuric acid at 20° C. or below. When solution is complete 1.6 parts of hydrated magnesium sulfate (Epsom salts or $MgSO_4 + 7\ H_2O$) are added under efficient agitation over a period of 1 to 2 hours. The mass is agitated for several hours longer at a temperature of below 20° C., then drowned in 60 to 80 parts of cold water, filtered and washed acid free. This filter cake which is micro-crystalline in nature has a color solids content of 20 to 25%.

*Example 4*

1 part of chlorinated dibenzanthrone is dissolved in 15 parts of 96% sulfuric acid at room temperature. When solution is complete 4.2 parts of sodium borate (borax, $Na_2B_4O_7 + 10\ H_2O$) are added at below 30° C. The mass is agitated for several hours and drowned in 60 to 80 parts of water, filtered, and washed acid-free. This gives a uniform micro-crystalline press cake which contains 15 to 20% color solids.

*Example 5*

1 part of chlorinated isodibenzanthrone is dissolved in 10 parts of 99% sulfuric acid. When solution is complete, 3 parts of hydrated sodium sulfate ($Na_2SO_4 + 10\ H_2O$) are added with cooling and efficient agitation while the temperature is maintained below 20° C. It is agitated several hours longer, drowned in 60 to 80 parts of cold water, and isolated in the usual manner.

*Example 6*

1 part of Bz-2:Bz-2'-dimethoxydibenzanthrone is dissolved in 15 parts of 98 to 99% sulfuric acid at a temperature below 10° C. When solution is complete, 3.75 parts of hydrated sodium sulfate ($Na_2SO_4 + 10\ H_2O$), are added slowly at below 10° C. The mass is agitated thoroughly for 1 to 3 hours, drowned on ice and diluted to a total of 60 to 80 parts with cold water, filtered and washed acid-free. This uniform micro-crystalline press cake contains 30 to 35% color solids.

These dyestuffs may be precipitated in this fine micro-crystalline form by the addition of an anhydrous salt, such as anhydrous sodium sulfate, to the solution of the dyestuff in sulfuric acid and then adding an amount of water equivalent to the water of hydration, as illustrated by the following example, which is considered to be the equivalent of the use of the hydrated salt.

*Example 7*

1 part of pyranthrone is dissolved in 10 parts of 98% sulfuric acid at 20 to 40° C. The solution is then cooled to about 25° C. and with efficient agitation, 1.5 parts of anhydrous sodium sulfate are added. 1.9 parts of water are then added slowly over a period of 1 to 2 hours. The mass is agitated for several hours, drowned in 60 to 70 parts of cold water, filtered and washed acid-free. The resulting press cake contains about 30 to 35% color solids and gives a uniform micro-crystalline dyestuff paste.

It is understood that the above examples are given to illustrate the invention and that other dyes within the classes named, such as dibenzpyrenequinone, isodibenzanthrone, halogenated pyranthrones, 7',8'(N) - 7",8"(N) - di(benzacridone)-1,1'-5,1" - trianthrimidecarbazole; 4,4'-di(benzoylamino) - 1,1'-dianthrimidecarbazole, dibenzanthrone, etc. may be used.

The hydrated salts employed in the examples may be substituted by other salts such as hydrated sodium acetate ($NaC_2H_3O_2 + 3\ H_2O$), potassium alum ($K_2Al_2(SO_4)_4 + 24\ H_2O$), sodium sulfate ($Na_2SO_4 + 7\ H_2O$), aluminum sulfate ($Al_2(SO_4)_3 + 18\ H_2O$) sodium phosphate $$(Na_3PO_4 + 12\ H_2O)$$

Sodium alum ($Na_2SO_4.Al_2(SO_4)_3.24\ H_2O$), ammonium alum ($(NH_4)_2Al_2(SO_4)_4 + 24\ H_2O$) and iron ammonium alum ($Fe_2(NH_4)_2(SO_4)_4 + 24H_2O$).

The amount of hydrated salt required will depend upon the amount of water of crystallization the salt contains and on the sulfuric acid concentration at which the particular dye is substantially completely precipitated.

The vat color pastes prepared by this process are particularly suitable for padding, due to the uniform microcrystalline nature of the paste. The paddings are stronger and the reduction of the padded color is more rapid than those obtained from the same colors when processed according to the known methods. In the printing of fabrics they give even prints of good strength.

I claim:

1. In the process for preparing dye pastes and powders of anthraquinone vat dyestuffs of the group consisting of those containing the pyrene, perylene and anthrimide-carbazole nucleus which nucleus is in a condensed ring system containing the quinoid structure, in a uniformly fine, micro-crystalline form the steps which comprise dissolving said dyestuffs in concentrated sulfuric acid, adding a sufficient quantity of a hydrated salt of a metal whose sulfate is water soluble to the acid solution to precipitate substantially all of the dyestuff, and separating out the micro-crystalline dyestuff so precipitated.

2. In the process for preparing dye pastes and powders of anthraquinone vat dyestuffs of the group consisting of those containing the pyrene, perylene and anthrimide-carbazole nucleus which nucleus is in a condensed ring system containing the quinoid structure, in a uniformly fine, micro-crystalline form the steps which comprise dissolving said dyestuffs in concentrated sulfuric acid, adding a sufficient quantity of a hydrated salt of a metal whose sulfate is water soluble to the acid solution to precipitate substantially all of the dyestuff, and separating out the micro-crystalline dyestuff so precipitated by drowning the mass in water and filtering.

3. In the process for preparing dye pastes and powders of those anthraquinone vat dyestuffs which contain the pyrene nucleus which nucleus is in a condensed ring system containing the quinoid structure in a uniformly fine, microcrystalline form, the steps which comprise dissolving said dyestuffs in concentrated sulfuric acid, adding a sufficient quantity of a hydrated salt of a metal whose sulfate is water soluble to the acid solution to precipitate substantially all of the dyestuff, and separating out the micro-crystalline dyestuff so precipitated by drowning the mass in water and filtering.

4. In the process for preparing dye pastes and powders of those anthraquinone vat dyestuffs which contain the perylene nucleus which nucleus is in a condensed ring sytem containing the quinoid structure in a uniformly fine, micro-crystalline form, the steps which comprise dissolving said dyestuffs in concentrated sulfuric acid, adding a sufficient quantity of a hydrated salt of a metal whose sulfate is water soluble to the acid solution to precipitate substantially all of the dyestuff, and separating out the micro-crystalline dyestuff so precipitated by drowning the mass in water and filtering.

5. In the process for preparing dye pastes and powders of anthrimide-carbazole vat dyestuffs in a uniformly fine, micro-crystalline form, the steps which comprise dissolving said dyestuffs in concentrated sulfuric acid, adding a sufficient quantity of a hydrated salt of a metal whose sulfate is water soluble to the acid solution to precipitate substantially all of the dyestuff, and separating out the micro-crystalline dyestuff so precipitated by drowning the mass in water and filtering.

6. In the process for preparing dye pastes and powders of chlorinated isodibenzanthrone in a uniformly fine, micro-crystalline form, the steps which comprise dissolving said dyestuffs in concentrated sulfuric acid, adding a sufficient quantity of a hydrated salt of a metal whose sulfate is water soluble to the acid solution of the dyestuff to precipitate substantially all of the dyestuff, drowning the mass in water and filtering off the uniformly fine micro-crystalline dyestuff.

7. In the process for preparing dye pastes and powders of pyranthrone in a uniformly fine, micro-crystalline form, the steps which comprise dissolving said dyestuffs in concentrated sulfuric acid, adding a sufficient quantity of a hydrated salt of a metal whose sulfate is water soluble to the acid solution of the dyestuff to precipitate substantially all of the dyestuff, drowning the mass in water and filtering off the uniformly fine micro-crystalline dyestuff.

8. In the process for preparing dye pastes and powders of anthraquinone vat dyestuffs of the group consisting of those containing the pyrene, perylene and anthrimide-carbazole nucleus which nucleus is in a condensed ring system containing the quinoid structure, in a uniformly fine, micro-crystalline form, the steps which comprise dissolving said dyestuffs in concentrated sulfuric acid, adding a sufficient quantity of a dehydrated salt which exists in a hydrated form together with an amount of water equal to that held by the salt in a hydrated form to precipitate substantially all of the dyestuff, the salt being of a metal whose sulfate is water soluble, and separating out the micro-crystalline dyestuff so precipitated.

9. In the process for preparing dye pastes and powders of anthraquinone vat dyestuffs of the group consisting of those containing the pyrene, perylene and anthrimide-carbazole nucleus which nucleus is in a condensed ring system containing the quinoid structure, in a uniformly fine, micro-crystalline form, the steps which comprise dissolving said dyestuffs in concentrated sulfuric acid, adding to said solution an anhydrous salt of a metal whose sulfate is water soluble and which ordinarily exists in a hydrated form, then adding to the solution an amount of water approximately equal to the quantity of water held by said salt in a hydrated form, the amount of salt and water being sufficient to precipitate substantially all of the dyestuff, and separating out the micro-crystalline dyestuff thus precipitated.

CLIFFORD EDWARD CARR.